No. 635,863. Patented Oct. 31, 1899.
J. W. LEDOUX.
VALVE REGULATING MECHANISM.
(Application filed July 5, 1899.)
(No Model.) 4 Sheets—Sheet 1.
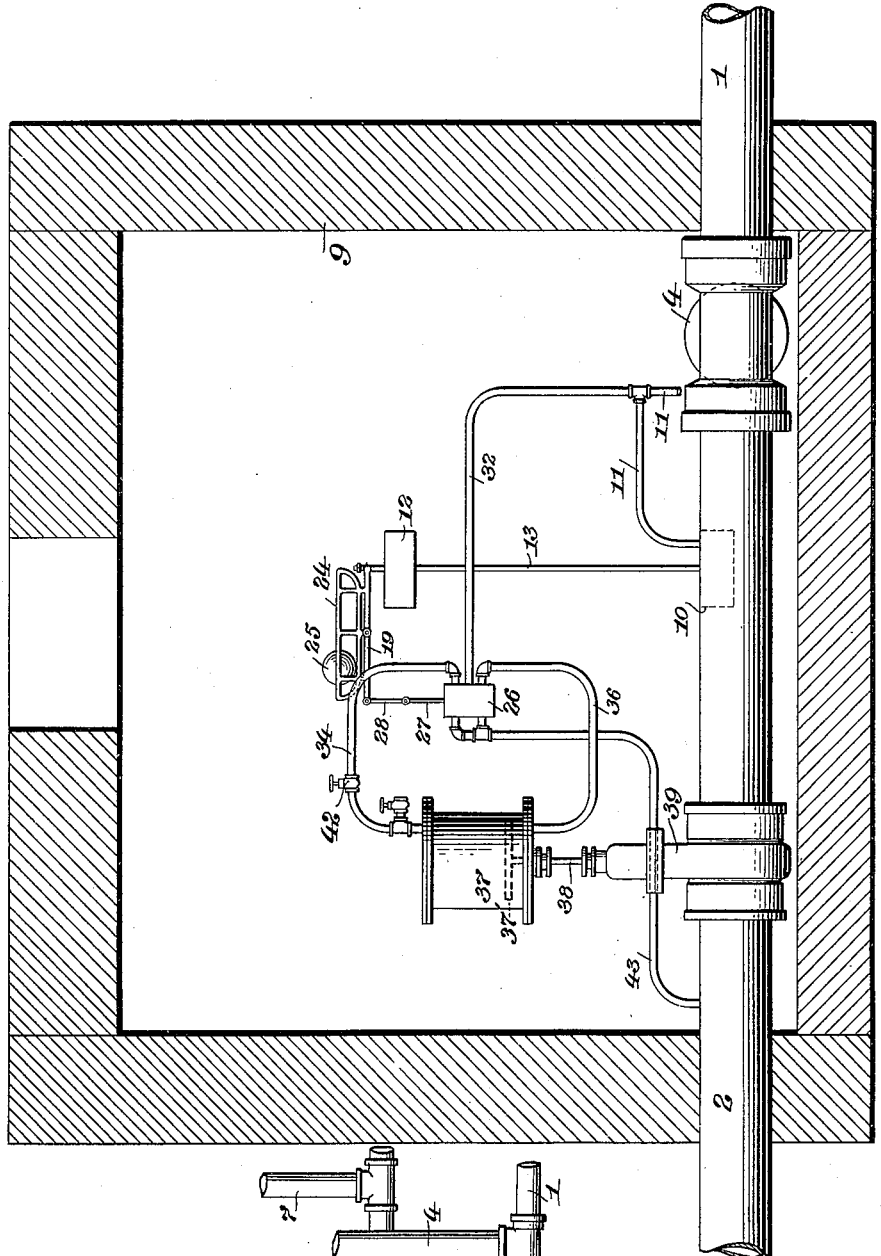
Fig. 1.
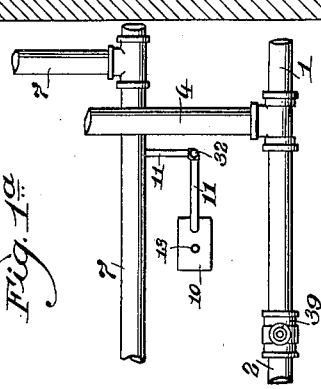
Fig. 1ª
Witnesses:
Henry Drury
Clarence H. Snyder
Inventor:
John W. Ledoux
By Chas. N. Butler
Atty No. 635,863. Patented Oct. 31, 1899.
J. W. LEDOUX.
VALVE REGULATING MECHANISM.
(Application filed July 5, 1899.)
(No Model.) 4 Sheets—Sheet 3.
Fig. 3.
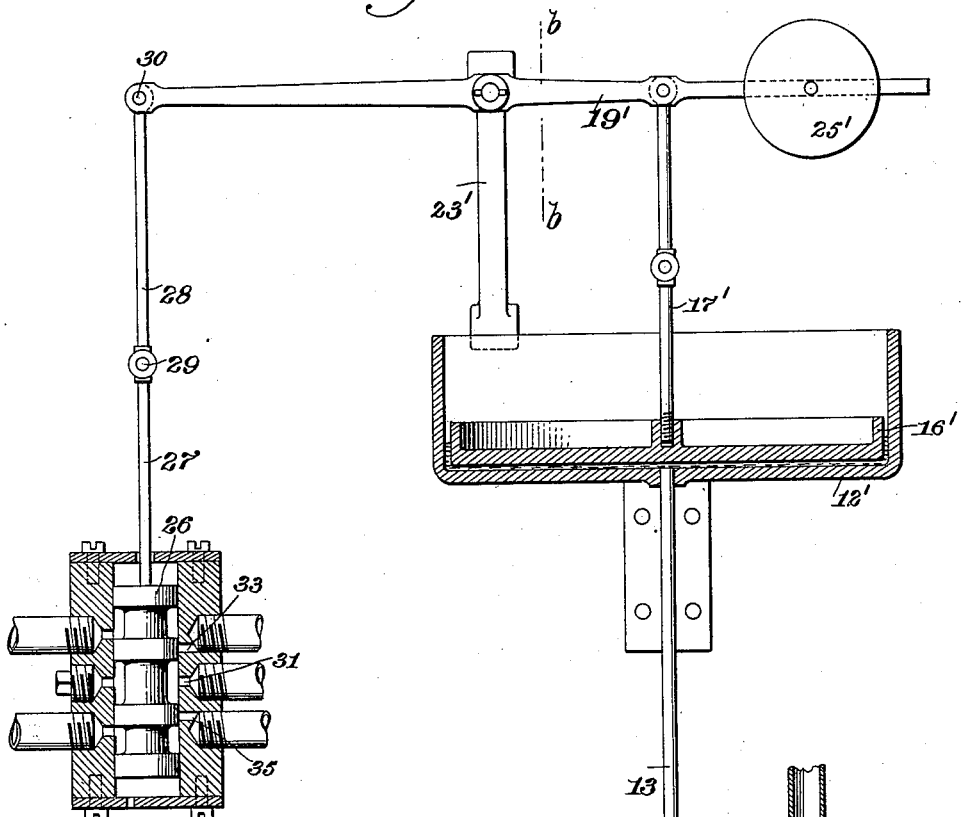
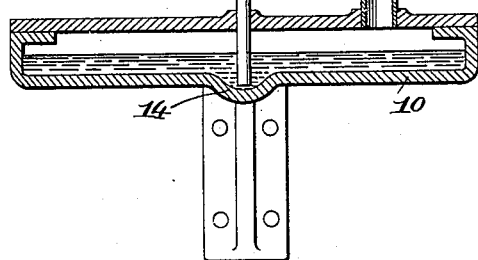
Fig. 3b.
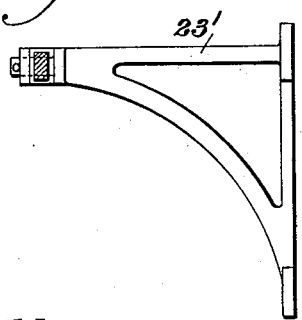
Witnesses:
Henry Drury
Clarence H. Snyder
Inventor:
John W. Ledoux
By Chas. N. Butler
Atty No. 635,863. Patented Oct. 31, 1899.
J. W. LEDOUX.
VALVE REGULATING MECHANISM.
(Application filed July 5, 1899.)

(No Model.) 4 Sheets—Sheet 4.

Witnesses:
Henry Drury
Clarence T. Snyder

Inventor:
John W. Ledoux
By
Chas. N. Butler
Atty

THE NORRIS PETERS CO., PHOTO-LITHO., WASHINGTON, D. C.

UNITED STATES PATENT OFFICE.

JOHN W. LEDOUX, OF SWARTHMORE, PENNSYLVANIA.

VALVE-REGULATING MECHANISM.

SPECIFICATION forming part of Letters Patent No. 635,863, dated October 31, 1899.

Application filed July 5, 1899. Serial No. 722,812. (No model.)

*To all whom it may concern:*

Be it known that I, JOHN W. LEDOUX, residing at Swarthmore, in the county of Delaware, State of Pennsylvania, have invented new and useful Valve-Regulating Mechanism, of which the following is a specification.

My invention is designed particularly for the automatic regulation of water distribution, so that different elevations in the distribution system may be supplied without lifting the water required for the lower levels to the height required for the upper levels. This is accomplished by pumping through branch mains into reservoirs having different elevations, as required by the different levels to be supplied, and regulating the flow to the respective reservoirs by an automatic valve controlled by the differential pressure or pressure variation in the high-pressure distribution system. For this purpose I have devised a valve-regulating mechanism comprising a device for operating a float connected with an auxiliary valve, which valve permits water under pressure to pass to either side of a piston, the piston operating the main valve.

My invention is illustrated in the accompanying drawings, in which—

Figure 2:
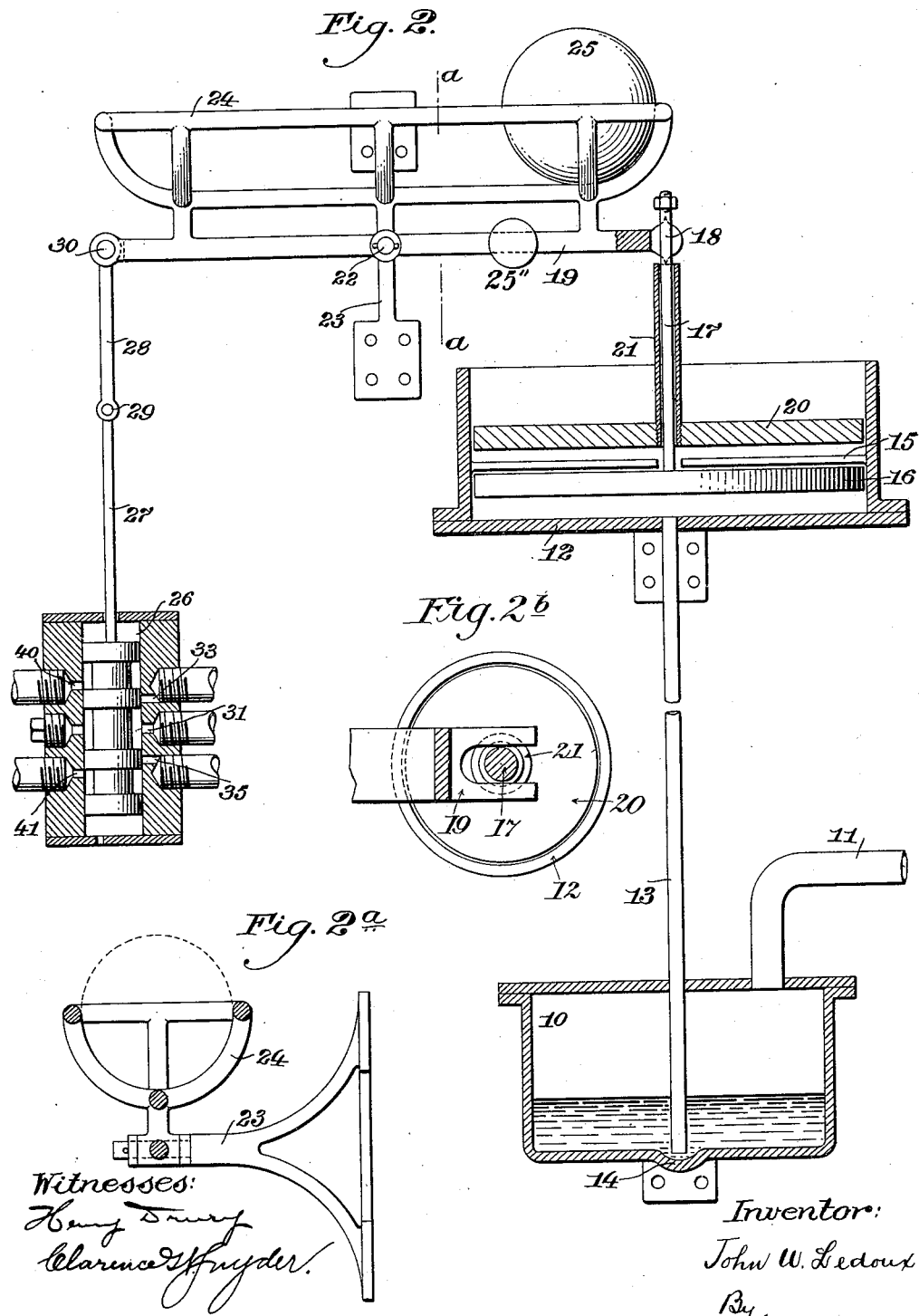
Figure 4:
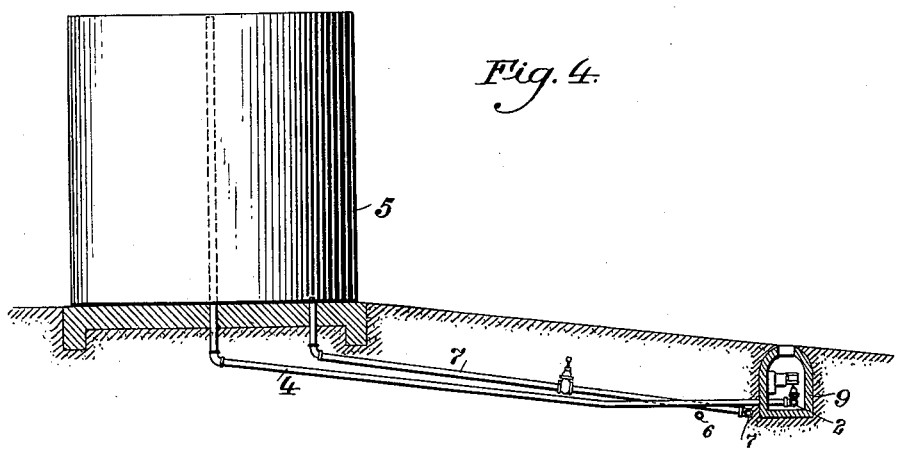
Figure 5:
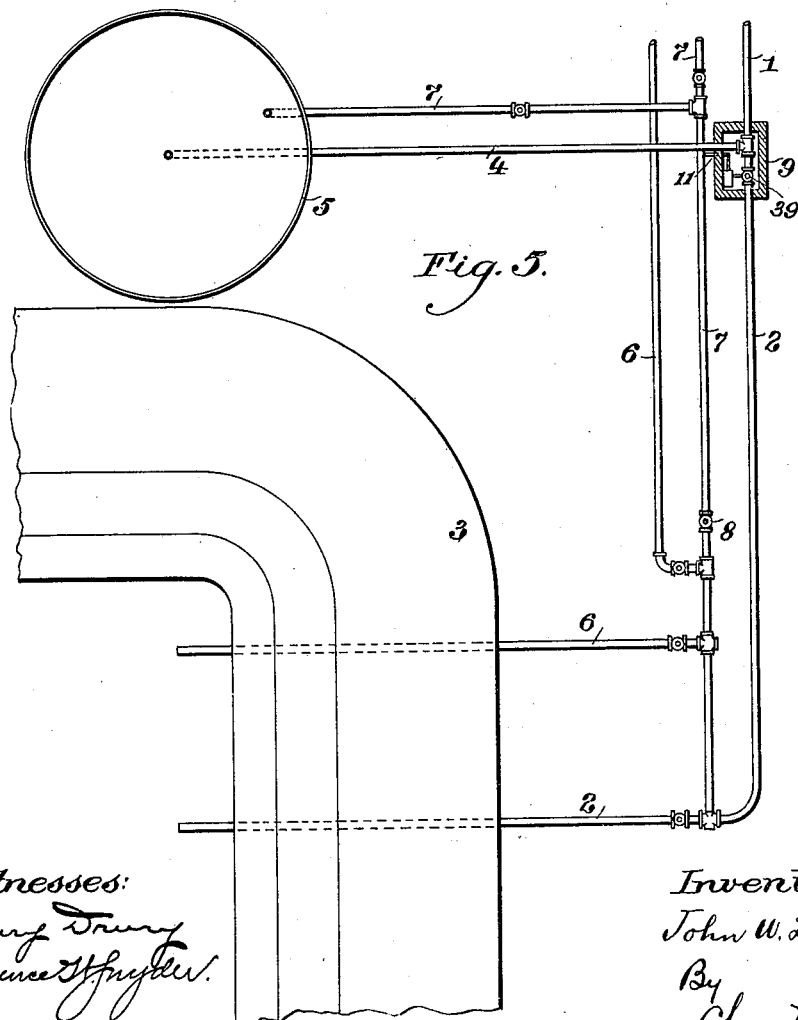

Figure 1 is a side elevation of the automatic valve-regulating mechanism. Fig. 1$^a$ is a detail plan view of the connections through which the float is operated. Fig. 2 is a sectional elevation of the auxiliary valve and float with their connections. Fig. 2$^a$ is a sectional elevation on the line $a\,a$ of Fig. 2. Fig. 2$^b$ is a plan view, partially in section, of a detail comprising the connection between the compound float and the lever operated by it. Fig. 3 is a sectional elevation of the auxiliary valve and a modified form of float with their connections. Fig. 3$^b$ is a sectional elevation on the line $b\,b$ of Fig. 3. Fig. 4 is an elevation of a stand-pipe, and Fig. 5 is a plan view of a stand-pipe and a section of a reservoir with the connecting-mains for the application of the invention.

Referring to the drawings, the pumping-main 1 leads by the conduit 2 to the reservoir 3 and by the conduit 4 to the top of the stand-pipe 5, the reservoir supplying the low-pressure distribution system 6 and the stand-pipe having the higher elevation required supplying the high-pressure distribution system 7, the two distribution systems being separated by the valve 8.

Within the valve-gallery 9 at the junction of the branch pumping-mains is placed a mercury-reservoir 10, connected with the stand-pipe or high-pressure distribution system 7 by the pipe 11 and with a float-reservoir 12 by a pipe 13, the lower end of the pipe 13 preferably extending into a cup 14, formed in the bottom of the mercury-reservoir. The float-reservoir, as illustrated in Fig. 2, is divided horizontally by a partition 15, open for the free passage of liquid. A float 16 in this reservoir beneath the partition is connected by the rod 17 and its yoke 18 with the lever 19. The yoke is constructed to permit the lever to rise in addition to the rise of its float and to draw the lever down when its float falls. A second float 20 above the partition is provided with a hollow rod 21; sleeved on the rod 17, the rod 21 striking the end of the lever 19 and thrusting it up when its float rises. The lever 19 is pivoted at 22 on a fixed fulcrum or bracket 23 and is provided with a rollway 24, which contains a ball 25, the ball effecting the complete throw of the lever in either direction when the rollway has been slightly inclined by the limited movement of the floats or compound float in the compound reservoir therefor.

The float and lever may be modified, as illustrated in Fig. 3, in which the reservoir 12' contains the float 16', connected by the rod 17' with the lever 19', pivoted on the bracket 23', the lever being provided with the adjustable counterweight 25'.

An auxiliary valve 26 is operated by the rod 27, connected to the lever 19 or 19' by the link 28, pivoted at 29 and 30. The valve-port 31 may be connected by the pipe 32 with the high-pressure distribution system 7 or with any other suitable source of pressure. The port 33 is connected by a pipe 34 and the port 35 is connected by a pipe 36 with opposite ends of a cylinder 37, having a piston 37', which is connected by the stem 38 with a lift-valve 39, placed in the main 2. The rapidity of action of the lift-valve 39 may be regulated by means of valves, as 42, placed in the pipes 34 and 36, or by varying the size of these pipes. The ports 40 and 41 communicate with a pipe 43, which is connected with the main 2, serving as exhausts controlled by the auxiliary valve for the cylinder 37.

In the operation of the invention the action of the lift-valve 39 depends upon the action of the auxiliary valve 26, which controls the ports 31, 33, and 35, through which pressure is communicated to the cylinder 37 and piston 37'. The action of the auxiliary valve is controlled through its connections with the lever 19 or 19', floats 16 and 20 or 16', mercury-reservoir 14, and high-pressure distribution system 7. Mercury is employed in the reservoir 10 to balance the head in the high-pressure system and to serve as a motor for lifting the floats when the head in the high-pressure system has risen to the maximum. Additional reasons for employing mercury are found in the facts that it permits the use of apparatus of minimum volume and is proof against frost.

Assuming the lift-valve 39 closed, then the pumps will force water through the mains 1 and 4 into the stand-pipe 5 until the pressure in the distribution system 7, acting through the pipe 11 upon the surface of the mercury in the reservoir 10, forces the mercury up through the pipe 13 into the float-chamber 12 or 12'. When the mercury has risen sufficiently to lift the floats 16 and 20, the float 20, acting through its rod 21, tips the lever 19 and causes the ball 25 to run to the opposite end of the rollway 24. This completes the throw of the lever to the extent permitted by the yoke 18 and the rise of the float 16, or the mercury rising in the reservoir 12' lifts the float 16' and the lever 19' through the complete throw of the lever. The operation of the lever, by the rise of the float actuating it, drops the auxiliary valve 26 and opens communication between the ports 31 and 35. Pressure is then communicated from any sufficient or suitable source through the pipe 32, ports 31 and 35, and pipe 36 to the under side of the piston 37' in the cylinder 37. In some instances this pressure may be that of the high distribution system; but greater pressure may be required for operating the piston which actuates the lift-valve 39. When the lift-valve rises, water is forced under lower pressure into the reservoir until the stand-pipe head has fallen so that the pressure in the high distribution system is not sufficient to sustain the column of mercury. The fall of the mercury permits the float for drawing down the lever to fall by gravity, thus operating the lever and lifting the auxiliary valve. When the auxiliary valve has risen, the ports 31 and 33 are in communication and pressure is communicated from the pipe 32 through these ports and the pipe 34 to the upper side of the piston 37, which descends, thus closing the valve 39 and causing water to be forced into the stand-pipe.

It will be evident that although this automatic valve-operating mechanism is illustrated and described in its application to water distribution it may be employed in any other relation in which it is desired to operate a valve by differential pressure.

Having thus described my invention, I claim—

1. In a valve-regulating mechanism, a valve, a lever connected with said valve, a compound float connected with said lever, a compound reservoir for said float, a pressure-reservoir, and a pipe leading from said pressure-reservoir to said float-reservoir, substantially as specified.

2. In a valve-regulating mechanism, a valve, a cylinder and piston connected therewith, an auxiliary valve connected with said cylinder and controlling said piston, a lever connected with said auxiliary valve for operating the same and a float connected with said lever, substantially as specified.

3. The combination of a cylinder and a piston therein, with a valve having two ports leading to the opposite ends of said cylinder, a third port leading to said valve, a lever connected with said valve, a float connected with said lever, a reservoir for said float and a pressure-reservoir connected with said float-reservoir, substantially as specified.

4. In a valve-operating mechanism, a valve, a piston and cylinder connected therewith, in combination with an auxiliary valve having ports leading to either end of said cylinder, exhaust-ports communicating with said auxiliary valve, and a port through which pressure is communicated, substantially as specified.

5. In a valve-operating mechanism, a valve, a piston connected therewith, a cylinder for said piston, in combination with an auxiliary valve having ports leading to either end of said cylinder, exhaust-ports communicating with either end of said auxiliary valve and a port through which pressure is communicated, a lever connected with said auxiliary valve, and a float connected with said lever, substantially as specified.

6. The combination of a float-reservoir separated into two communicating chambers, and a float located in each of said chambers, with a pressure-reservoir, and a pipe leading from said pressure-reservoir to said float-reservoir, substantially as specified.

7. In a valve-operating mechanism, a valve, a lever connected therewith, a float-reservoir separated into two communicating chambers, a float in each of said chambers, each of said floats being connected with said lever, a pressure-reservoir, and a pipe leading from said pressure-reservoir to said float-reservoir.

8. The combination of a float-reservoir separated into two communicating chambers, with a float in each of said chambers, a rod connecting one of said floats with said lever, and a second rod connected with the other of said floats and engaging with said lever, said second rod being tubular and sleeved on said first rod, substantially as specified.

9. The combination of a pressure-reservoir and mercury therein, with a float-reservoir, a float therein, a conduit connecting said mercury with said float-reservoir, and a conduit through which pressure is applied to the surface of said mercury, substantially as specified.

10. The combination of a pressure-reservoir and mercury therein, with a float-reservoir, a float therein, a pipe having its lower end immersed in said mercury, said pipe being connected with said float-reservoir, and a pipe connected with said pressure-reservoir for the application of pressure to the surface of the mercury contained therein, substantially as specified.

11. In the combination of a high-pressure system with a low-pressure system, a valve for controlling the supply, a piston for operating said valve, a cylinder for said piston, an auxiliary valve controlling the ports to said cylinder, a lever connected with said auxiliary valve, a float connected with said lever, a float-reservoir for said float, a pressure-reservoir, a pipe connecting said pressure-reservoir with said float-reservoir, and a pipe connecting said pressure-reservoir with said high-pressure system, substantially as specified.

In testimony whereof I have hereunto signed my name, in the presence of the subscribing witnesses, this 1st day of July, A. D. 1899.

JOHN W. LEDOUX.

Witnesses:
  J. E. GIBSON,
  W. H. ROTH.